United States Patent
Yamaguchi et al.

(10) Patent No.: US 10,078,175 B2
(45) Date of Patent: Sep. 18, 2018

(54) ILLUMINATING DEVICE WITH MULTIPLE OPTICAL GUIDING BODIES HAVING DIFFERENT LUMINANCE DISTRIBUTIONS

(71) Applicant: Valeo Japan Co., Ltd., Saitama (JP)

(72) Inventors: Satoshi Yamaguchi, Tokyo (JP); Masaaki Toju, Tokyo (JP); Masamichi Ishibashi, Tokyo (JP)

(73) Assignee: Valeo Japan Co., Ltd. (JP)

( * ) Notice: Subject to any disclaimer, the term of this patent is extended or adjusted under 35 U.S.C. 154(b) by 149 days.

(21) Appl. No.: 15/158,342

(22) Filed: May 18, 2016

(65) Prior Publication Data

US 2017/0131459 A1   May 11, 2017

(30) Foreign Application Priority Data

May 19, 2015 (JP) ................................ 2015-101626

(51) Int. Cl.
*F21V 8/00* (2006.01)
*B60Q 3/62* (2017.01)
*B60Q 3/80* (2017.01)

(52) U.S. Cl.
CPC ........... *G02B 6/0068* (2013.01); *G02B 6/005* (2013.01); *G02B 6/0038* (2013.01);
(Continued)

(58) Field of Classification Search
CPC ... B60Q 3/10; B60Q 3/14; B60Q 3/16; B60Q 3/18; B60Q 3/62; B60Q 3/64; B60Q 3/66;
(Continued)

(56) References Cited

U.S. PATENT DOCUMENTS

| | | | |
|---|---|---|---|
| 2008/0002434 A1* | 1/2008 | Hsieh | G02B 6/0036 362/626 |
| 2008/0030650 A1 | 2/2008 | Kitagawa et al. | |

(Continued)

FOREIGN PATENT DOCUMENTS

| | | |
|---|---|---|
| DE | 19813595 A1 | 9/1999 |
| FR | 2210323 A5 | 7/1974 |
| JP | 2014-008803 A | 1/2014 |

OTHER PUBLICATIONS

European Search Report dated Oct. 7, 2016 for EP 16167820.
English Abstract of DE 19813595.

*Primary Examiner* — Karabi Guharay
*Assistant Examiner* — Steven Horikoshi
(74) *Attorney, Agent, or Firm* — Fishman Stewart PLLC (57) ABSTRACT

An illuminating device may include an optical guiding body configured to dispose linear optical guiding members side by side, the linear optical guiding members guiding light incident from one end side in a longitudinal direction to another end side. The illuminating device may also include optical sources to emit light toward corresponding linear optical guiding members. The optical guiding body may include first and second optical guiding members adjacent in a width direction. A luminance distribution of the light in the longitudinal direction emitted from the first optical guiding member becomes darker, and that emitted from the second optical guiding member becomes brighter, according to being closer to the other end side from the one end side. The illuminating device may further include a control unit configured to light up the optical sources of the first and second optical guiding members in order and thereafter, light them out in order.

3 Claims, 8 Drawing Sheets

(52) U.S. Cl.
CPC ......... *G02B 6/0051* (2013.01); *G02B 6/0058* (2013.01); *G02B 6/0078* (2013.01); *G02B 6/0088* (2013.01); *B60Q 3/62* (2017.02); *B60Q 3/80* (2017.02)

(58) Field of Classification Search
CPC . F21V 2200/20; G02B 6/0058; G02B 6/0073; G02B 6/0075; G02B 6/0076; G02B 6/0078; G02B 6/008
See application file for complete search history.

(56) References Cited

U.S. PATENT DOCUMENTS

| | | |
|---|---|---|
| 2011/0227895 A1 | 9/2011 | Takahashi et al. |
| 2012/0075326 A1* | 3/2012 | Tsuchiya .............. G02B 6/0058 345/589 |
| 2013/0176706 A1 | 7/2013 | Deom et al. |
| 2015/0092434 A1 | 4/2015 | Satake et al. |

* cited by examiner

ILLUMINATING DEVICE WITH MULTIPLE OPTICAL GUIDING BODIES HAVING DIFFERENT LUMINANCE DISTRIBUTIONS

CROSS-REFERENCE TO RELATED APPLICATION

This application claims priority under 35 U.S.C. § 119 from Japanese Patent Application No. 2015-101626 filed on May 19, 2015, the disclosure of which is incorporated by reference herein.

TECHNICAL FIELD

The present invention relates to an illuminating device.

BACKGROUND

Japanese Patent Laid-Open Publication No. 2014-8803 discloses an illuminating device in which optical sources are arranged in one end and the other end of an optical guiding member in the longitudinal direction, and repeating lighting-up of both of the optical source in the one end and the optical source of the other end, lighting-out of the optical source in the one end and lighting-out of both of the optical source in the one end and the optical source of the other end in order enables light to be visible in such a manner as to move from the one end to the other end within the optical guiding member.

However, since the optical source is provided in each of the one end and the other end in the optical guiding member in the longitudinal direction in the illuminating device, when a length of the optical guiding member in the longitudinal direction is made long, it is necessary to lengthen a wire lead connecting the optical source and a substrate or a length of the substrate.

Therefore, when the wire lead is made long, the arrangement of the wire lead becomes complicated and it is necessary to prepare a space for the arrangement of the wire lead, thus increasing a size of the illuminating device. In addition, when the substrate is made long, the illuminating device increases in size according to the increased length, and the manufacturing cost also increases. Therefore, there is a demand for performing visibility in such a manner that the light moves while avoiding the increasing size or the increasing manufacturing cost of the illuminating device.

SUMMARY

The present invention is made in view of the aforementioned problem, and an object of the present invention is to provide an illuminating device in which the visibility is made possible in such a manner that light moves while avoiding an increasing size and increasing manufacturing cost of the illuminating device.

According to the present invention, an illuminating device comprises:

an optical guiding body configured to dispose linear optical guiding members side by side in the width direction of the optical guiding members, the linear optical guiding member guiding light incident from one end in the longitudinal direction to the other end side;

optical sources prepared respectively for the optical guiding members to emit the light toward the corresponding optical guiding members; and a control unit configured to control lighting-up/lighting-out of each of the optical sources, wherein the optical guiding body includes a first optical guiding member and a second optical guiding member adjacent thereto in the width direction, a luminance distribution of illuminating light in the longitudinal direction emitted from the first optical guiding member becomes the darker according to being closer to the other end side from the one end side, a luminance distribution of illuminating light in the longitudinal direction emitted from the second optical guiding member becomes the brighter according to being closer to the other end side from the one end side, and the control unit lights up the optical source of the first optical guiding member and the optical source of the second optical guiding member in order and thereafter, lights them out in order.

With this configuration, when the optical sources light up, the one end side of the first optical guiding member in the longitudinal direction is the brightest, and the first optical guiding member becomes the darker according to being closer to the other end side. In addition, the one end side of the second optical guiding member in the longitudinal direction is the darkest, and the second optical guiding member becomes the brighter according to being closer to the other end side.

Therefore, when the control unit lights up the optical source of the first optical guiding member and the optical source of the second optical guiding member in order and thereafter, lights them out in order, in the optical guiding member the bright region is visible in such a manner as to move from the one end to the other end in the longitudinal direction.

In this way, the optical source is provided only in the one end of the optical guiding member in the longitudinal direction, and the bright region in the optical guiding body can be made visible in such a manner as to move from the one end to the other end. Therefore, it is possible to reduce the manufacturing cost by minimizing the length of the wire lead connecting the optical source and the substrate and the size of the substrate. Accordingly, the light can be made visible in such a manner as to move while avoiding the increasing size and increasing manufacturing cost of the illuminating device.

BRIEF DESCRIPTION OF THE DRAWINGS

Other objects, features, and advantages of the present invention will become more apparent from the following detailed description made with reference to the accompanying drawings, in which like parts are designated by like reference numbers and in which.

DETAILED DESCRIPTION

Hereinafter, an explanation will be made of an illuminating device 1 according to an embodiment of the present invention.

Figure 1A:
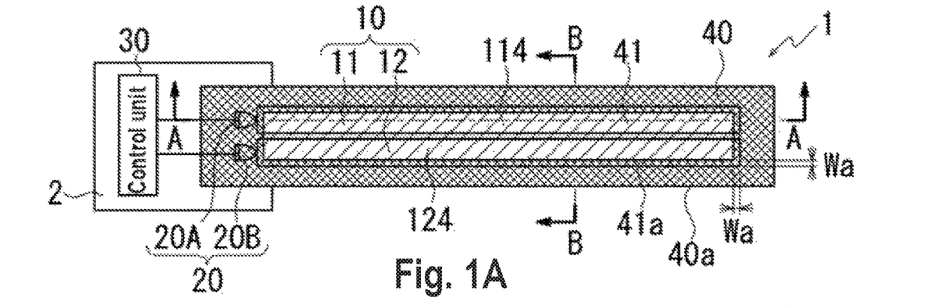
FIGS. 1A to 1D are diagrams explaining an illuminating device according to an embodiment of the present invention.
Figure 1B:
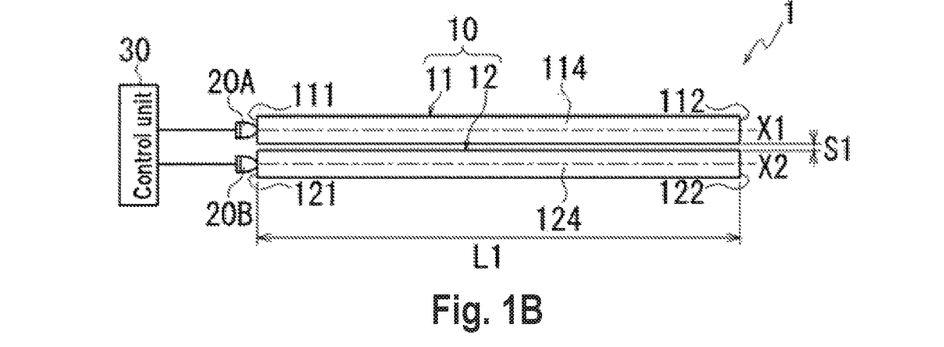
Figure 1C:
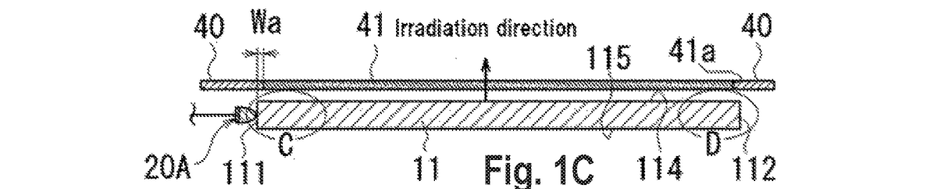
Figure 1D:
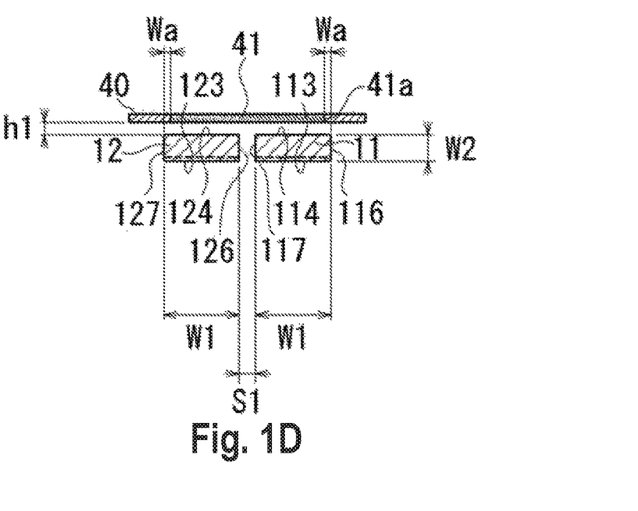

FIGS. 1A to 1D are schematic diagrams explaining the illuminating device 1, wherein FIG. 1A is a plan view illustrating the illuminating device 1 as viewed from an output surface side of light, FIG. 1B is a diagram illustrating a state where a light shielding member 40 is removed from the illuminating device 1 illustrated in FIG. 1A, FIG. 1C is a cross section taken in the direction of arrows A-A in FIG. 1A and FIG. 1D is a cross section taken in the direction of arrows B-B in FIG. 1A.

It should be noted that in FIGS. 1A to 1D, for descriptive purposes, illustration of a case accommodating an optical guiding body 10 and optical sources 20 is omitted, and a substrate 2 on which the optical sources 20 are provided is illustrated only in FIG. 1A.

As illustrated in FIG. 1A, the illuminating device 1 comprises an optical guiding body 10 that is configured to dispose linear optical guiding members (first optical guiding member 11 and second optical guiding member 12) side by side in the width direction, the linear optical guiding members guiding light incident from one end in the longitudinal direction to the other end side, optical sources 20 (optical sources 20A and 20B) prepared respectively for the optical guiding members (first optical guiding member 11 and second optical guiding member 12) to emit the light toward the corresponding optical guiding members (first optical guiding member 11 and second optical guiding member 12), a light shielding member 40 arranged to oppose output surfaces 114, 124 of the light of the first optical guiding member 11 and the second optical guiding member 12, and a control unit 30 configured to control lighting-up/lighting-out of each of the optical sources 20 (optical sources 20A and 20B).

As illustrated in FIG. 1D, the first optical guiding member 11 and the second optical guiding member 12 are linear members each formed with the same slight width W1 and the same slight thickness W2 and having a rectangular cross section.

As illustrated in FIG. 1B, the first optical guiding member 11 and the second optical guiding member 12 each have the same length L1, and are provided in parallel with each other to have an interval S1 in the width direction in a state of aligning positions of one ends 111, 121 and positions of the other ends 112, 122 of the first optical guiding member 11 and the second optical guiding member 12.

The one ends 111, 121 of the first optical guiding member 11 and the second optical guiding member 12 in the longitudinal direction each are respectively arranged to oppose the optical sources 20A, 20B on center axes X1, X2 of the first optical guiding member 11 and the second optical guiding member 12, and the one ends 111, 121 of the first optical guiding member 11 and the second optical guiding member 12 are formed as incident surfaces of the light emitted from the optical sources 20A, 20B.

Here, the optical sources 20A, 20B are mounted on the substrate 2 together with an MPU (computing unit) configuring the control unit 30, and in the embodiment, a light emitting diode (LED) is adopted as the optical source.

In the first optical guiding member 11 and the second optical guiding member 12, the opposing surfaces (upper side surfaces in FIG. 1D) to the light shielding member 40 (light diffusion portion 41) are formed as the output surfaces 114, 124 of the light incident on the first optical guiding member 11 and the second optical guiding member 12, and the opposite surfaces thereof (lower side surfaces in FIG. 1D) are formed as worked surfaces 113, 123 subjected to working for adjusting an optical amount of the light output from the output surfaces 114, 124.

The output surfaces 114, 124 of the first optical guiding member 11 and the second optical guiding member 12 are flat surfaces in parallel with the light diffusion portion 41, and the worked surfaces 113, 123 are provided with prisms 115, 125 projecting in a direction away from the output surfaces 114, 124 (refer to FIG. 2A to FIG. 3B).

Here, since a shape of the prism 115 of the first optical guiding member 11 is the same as that of the prism 125 of the second optical guiding member 12, a specific structure of the prism 115 will be herein explained by taking a case of the prism 115 of the first optical guiding member 11 as an example, and the prism 125 of the second optical guiding member 12 will be explained as needed.

Figure 2A:
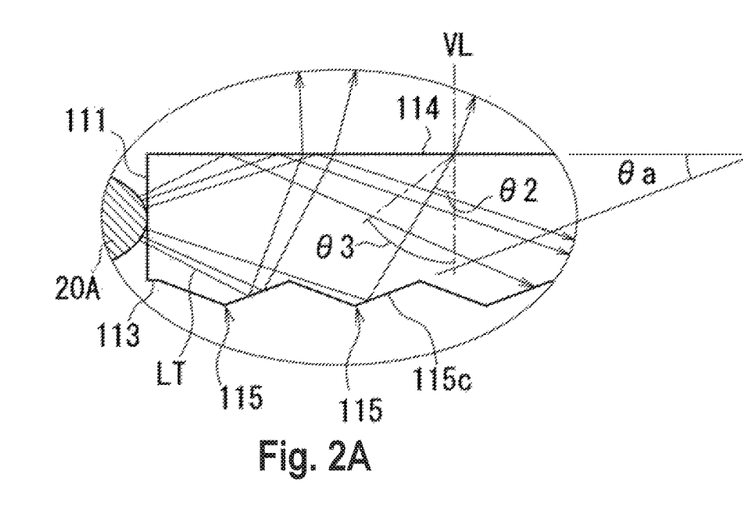
FIGS. 2A to 2D are diagrams explaining prisms of a first optical guiding member according to the embodiment.
Figure 2B:
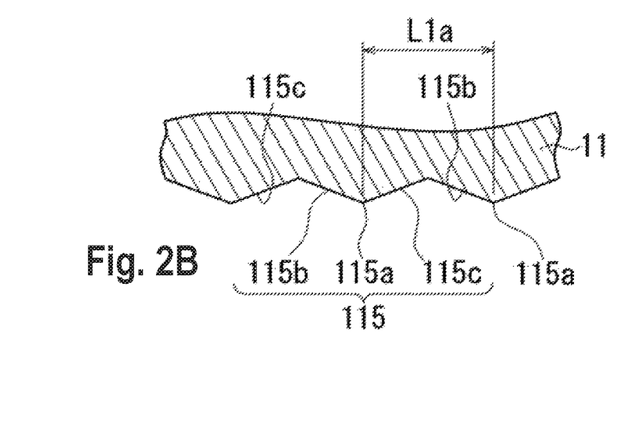
Figure 2C:
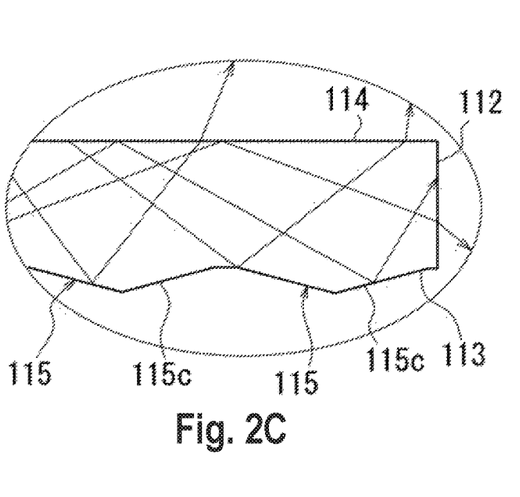
Figure 2D:
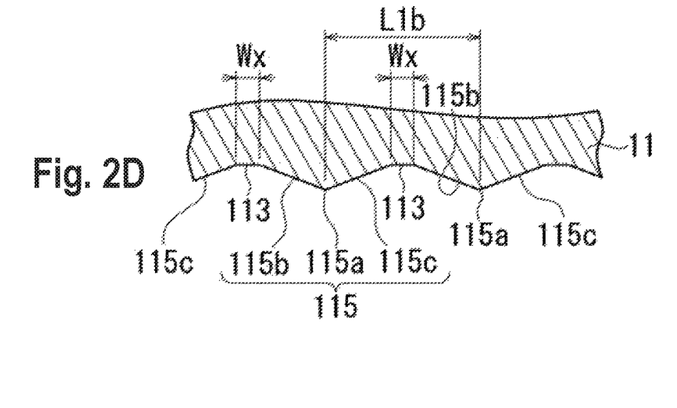

FIGS. 2A to 2D are diagrams explaining the prisms 115 of the first optical guiding member 11, wherein FIG. 2A is an enlarged diagram of the one end 111 side of the first optical guiding member 11 in the longitudinal direction (region C in FIG. 1C), FIG. 2B is an enlarged diagram explaining the prisms 115 provided on the worked surface 113 in the one end 111 side, FIG. 2C is an enlarged diagram of the other end 112 side of the first optical guiding member 11 in the longitudinal direction (region D in FIG. 1C), and FIG. 2D is an enlarged diagram explaining the prisms 115 provided on the worked surface 113 in the other end 112 side.

Figure 3A:
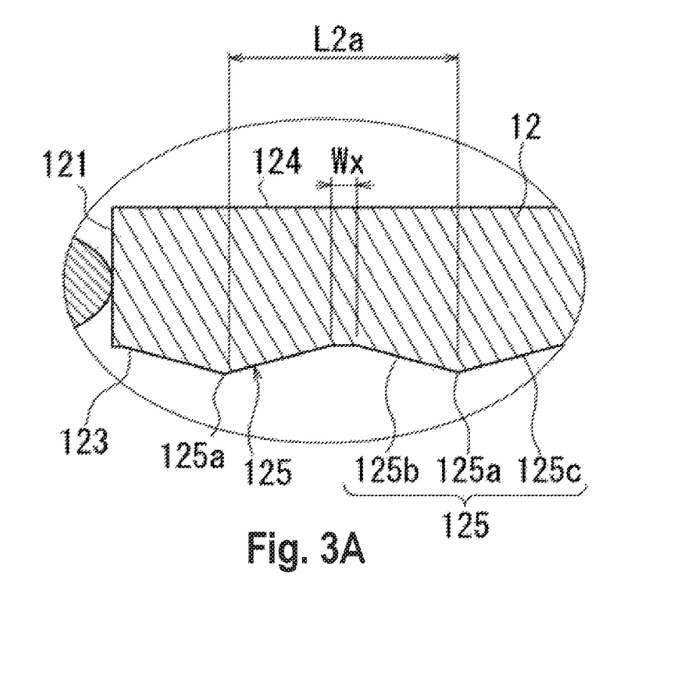
FIGS. 3A and 3B are diagrams explaining prisms of a second optical guiding member according to the embodiment.
Figure 3B:
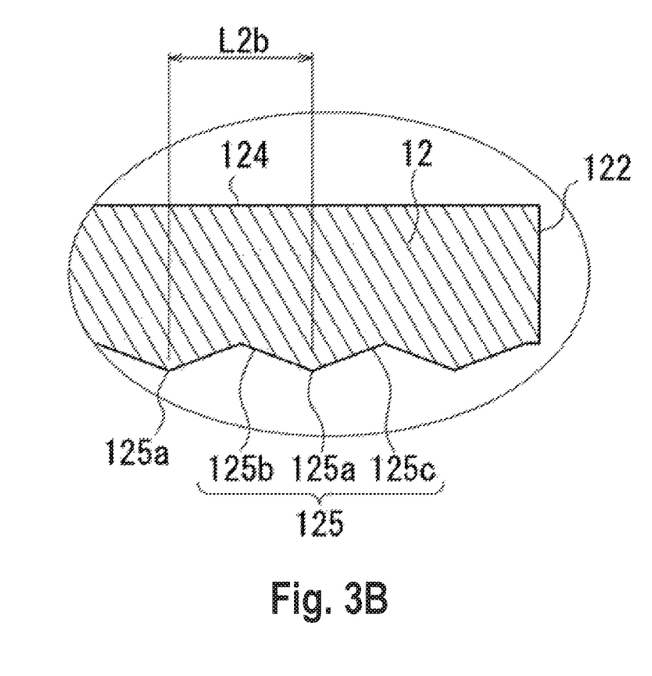

FIGS. 3A and 3B are diagrams explaining the prisms 125 of the second optical guiding member 12, wherein FIG. 3A is an enlarged diagram of the one end 121 side of the second optical guiding member 12 in the longitudinal direction, and FIG. 3B is an enlarged diagram of the other end 122 side.

As illustrated in FIGS. 2A to 2D, the prism 115 is formed in a sharp shape with an apex 115a positioned in a direction away from the output surface 114.

As viewed from the apex 115a, an inclined surface 115b positioned in the optical source 20A side (left side in FIG. 2A) and an inclined surface 115c in the opposite side (right side in FIG. 2A) are formed as flat surfaces along the width direction of the first optical guiding member 11, and the apex 115a as a boundary between the inclined surfaces 115b, 115c extends linearly in the width direction of the first optical guiding member 11.

The inclined surface 115c of the prism 115 is a reflecting surface of the light incident on the first optical guiding member 11. In the embodiment, the light reflected on the inclined surface 115c is guided to the output surface 114 of the first optical guiding member 11, and thereafter, is output from the output surface 114 to an exterior. An angle θa of the inclined surface 115c to a normal line VL of the output surface 114 is set such that an incident angle θ2 of the light reflected on the inclined surface 115c to the output surface 114 is less than a predetermined critical angle θ3 (broken lines in FIG. 2A) (refer to FIG. 2A).

Here, in the first optical guiding member 11, the prisms 115 are provided such that the density of the prisms 115 in the one end 111 (optical source 20A) side is higher than that of the prisms 115 in the other end 112 side.

Specifically, the prisms 115 are provided continuously in the longitudinal direction (left and right directions in the figure) of the first optical guiding member 11 in the one end 111 side of the optical guiding member 11 (refer to FIGS. 2A and 2B). On the other hand, the prisms 115 are provided to have an interval Wx therebetween in the longitudinal direction (left and right directions in the figure) of the first optical guiding member 11 in the other end 112 side (refer to FIGS. 2C and 2D).

In addition, a position of each prism 115 is defined such that the interval Wx between the adjacent prisms 115 in the longitudinal direction of the first optical guiding member 11 is the larger according to being closer to the other end 112 side.

Therefore, in the first optical guiding member 11 according to the embodiment, an interval (L1a or L1b) between the apexes 115a of the prisms 115 in the longitudinal direction of the first optical guiding member 11 is the wider according to being closer to the other end 112 side. The density of the prisms 115 is the smaller according to being closer to the other end 112 side.

Figure 4:
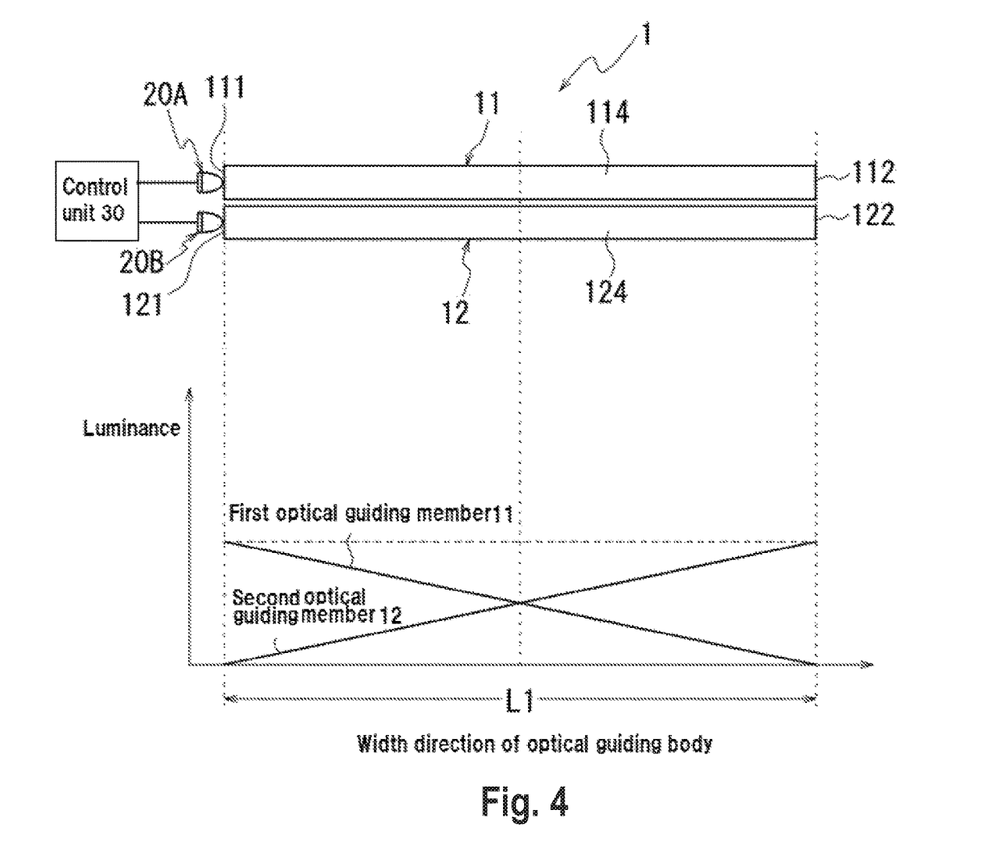
FIG. 4 is a diagram explaining a luminance distribution of an optical guiding body according to the embodiment.

Therefore, in the first optical guiding member 11, the amount of the light output from the output surface 114 is the smaller according to being closer to the other end 112 side from the one end 111 side, and as illustrated in FIG. 4, the amount of the light output from the first optical guiding member 11 (luminance distribution in the longitudinal direction) is gradually the smaller according to being closer to the other end 112 side from the one end 111.

On the other hand, in the second optical guiding member 12, as illustrated in FIGS. 3A and 3B, an interval (L2a or L2b) between the apexes 125a of the prisms 125 in the longitudinal direction of the second optical guiding member 12 is the narrower according to being closer to the other end 122 side, and the density of the prisms 125 is the larger according to being closer to the other end 122 side.

Therefore, in the second optical guiding member 12, the amount of the light output from the output surface 124 is the larger according to being closer to the other end 122 side from the one end 121 side, and as illustrated in FIG. 4, the amount of the light output from the second optical guiding member 12 (luminance distribution in the longitudinal direction) is gradually the larger according to being closer to the other end 122 side from the one end 121.

Here, in the optical guiding body 10 of the illuminating device 1, an air layer having a predetermined interval S1 is formed between the first optical guiding member 11 and the second optical guiding member 12 adjacent thereto (refer to FIG. 1D), and a portion of this air layer becomes a dark part on which the light is not emitted.

Therefore, in the optical guiding body 10, a streaky shade (dark part) is generated along the air layer at the time of lighting up both of the optical sources 20A, 20B.

In addition, as described before, in the first optical guiding member 11 and the second optical guiding member 12, a portion of each of the apexes 115a, 125a of the prisms 115, 125 extending in the width direction of the first optical guiding member 11 and the second optical guiding member 12 becomes the streaky shade.

Therefore, in the embodiment, for making it difficult to visualize the shade, a band-like light diffusion portion 41 is provided in the light shielding member 40 provided to oppose the optical guiding body 10 formed of the first optical guiding member 11 and the second optical guiding member 12.

The light diffusion portion 41 is the light shielding member 40 formed in a rectangular shape in a plan view, and is the band-like member provided along the first optical guiding member 11 and the second optical guiding member 12 in the longitudinal direction (refer to FIG. 1A). The light diffusion portion 41 is provided to have an interval h1 between the output surface 114 of the first optical guiding member 11 and the output surface 124 of the second optical guiding member 12 (refer to FIG. 1D).

The light diffusion portion 41 is provided over the interval S1 between the first optical guiding member 11 and the second optical guiding member 12 in the width direction of the optical guiding body 10 (upper-lower direction in FIG. 1A).

Therefore, a part of the light emitted from the output surface 114 of the first optical guiding member 11 and the light emitted from the output surface 124 of the second optical guiding member 12 is diffused by the light diffusion portion 41, and passes the interval S1 (the interval S1 between a side face 117 of the first optical guiding member 11 and a side face 126 of the second optical guiding member 12: refer to FIG. 1D)) between the first optical guiding member 11 and the second optical guiding member 12 in a transverse direction. This light passing the interval S1 in the transverse direction makes it difficult to visualize the streaky shade (dark part) formed in a portion of the interval S1 between the first optical guiding member 11 and the second optical guiding member 12.

In addition, since the light diffused by the light diffusion portion 41 passes also in a direction of traversing the apexes 115a, 125a of the prisms 115, 125 of the first optical guiding member 11 and the second optical guiding member 12, the light passing each of the apexes 115a, 125a in the traverse direction makes it difficult to visualize the stripe-shaped shade due to the apexes 115a, 125a of the prisms 115, 125.

In the embodiment, the light diffusion portion 41, as illustrated in FIGS. 1C and 1D, is formed in an outer shape (area) in which a peripheral edge 41a of the light diffusion portion 41 is arranged in a position offset by a predetermined width Wa inside from a peripheral edge (the one end 111, the other end 112 and the side face 116 of the first optical guiding member 11, and the one end 121, the other end 122 and the side face 127 of the second optical guiding member 12) of the optical guiding body 10.

The peripheral edge 41a of the light diffusion portion 41 is surrounded over an entire circumference by the plate-shaped light shielding member 40, and the light shielding member 40 is formed of non-transmissive material.

Therefore, in the optical guiding body 10 configured of the output surface 114 of the first optical guiding member 11 and the output surface 124 of the second optical guiding member 12, the peripheral edge of the optical guiding body 10 is clearly defined by a boundary between the light diffusion portion 41 and the light shielding member 40.

As a result, the peripheral edge of the light emitted from the optical guiding body 10 can be clearly distinguished, which can appropriately prevent the phenomenon that a peripheral edge of the emitted light becomes vague and the boundary of the light to be visualized blurs.

Next, an explanation will be made of an operation of the control unit 30 configured to control light emitting timing of the optical sources 20 (20A, 20B).

Figure 5:
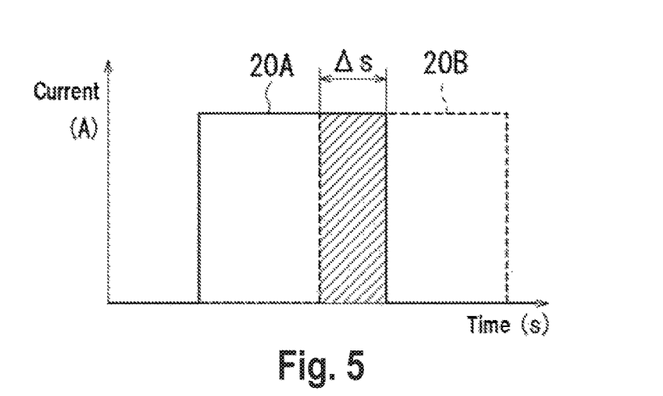
FIG. 5 is a diagram explaining control of lighting-up/lighting-out of an optical source by a control unit according to the embodiment.

FIG. 5 is a diagram explaining control of lighting-up/lighting-out of the optical source 20A and the optical source 20B by the control unit 30.

The control unit 30 is configured to, in response to reception of a predetermined operation command signal, (1) light up the optical source 20A, (2) light up the optical source 20B (simultaneously light up the optical source 20A and the optical source 20B), (3) light out the optical source 20A, and (4) light out the optical source 20B (simultaneously light out the optical source 20A and the optical source 20B).

Here, the time in which the optical source 20A and the optical source 20B both are lighting up is set to time Δs (refer to FIG. 5). The optical source 20A and the optical source 20B light up in order, and thereafter, light out in order.

As described before, the first optical guiding member 11 on which the light emitted from the optical source 20A is incident is set such that the amount of the light output from the output surface 114 is the smaller according to being closer to the other end 112 from the one end 111 in the longitudinal direction, and the second optical guiding member 12 on which the light emitted from the optical source 20B is incident is set such that the amount of the light output from the output surface 124 is the larger according to being closer to the other end 122 from the one end 121 in the longitudinal direction.

Therefore, when the lighting-up modes of the above (1) to (4) are performed, in the optical guiding body 10 formed of the first optical guiding member 11 and the second optical guiding member 12, the light can be made visible to a user in such a manner as to move from the one end to the other end within the optical guiding body 10.

As described above, according to the embodiment, (1) The illuminating device 1 comprises:

the optical guiding body 10 configured to dispose linear optical guiding members side by side in the width direction of the optical guiding members, the linear optical guiding members guiding light incident from one end in the longitudinal direction to the other end side;

the optical sources 20 prepared respectively for the optical guiding members to emit light toward the corresponding optical guiding members; and the control unit 30 configured to control lighting-up/lighting-out of each of the optical sources 20, wherein the optical guiding body 10 includes the first optical guiding member 11 and the second optical guiding member 12 adjacent thereto in the width direction, the luminance distribution of the light in the longitudinal direction emitted from the first optical guiding member 11 is configured in such a manner that the light becomes the darker according to being closer to the other end 112 side from the one end 111 side, the luminance distribution of the light in the longitudinal direction emitted from the second optical guiding member 12 is configured in such a manner that the light becomes the brighter according to being closer to the other end 122 side from the one end 121 side, and the control unit 30 is configured in such a manner as to light up the optical source 20A of the first optical guiding member 11, then the optical source 20B of the second optical guiding member 12, and light out the optical source 20A of the first optical guiding member 11, then the optical source 20B of the second optical guiding member 12, thus lighting up the optical source 20A and the optical source 20B in order and thereafter, lighting out the optical source 20A and the optical source 20B in order.

With this configuration, when the optical sources 20A, 20B light up, the one end 111 side of the first optical guiding member 11 in the longitudinal direction is the brightest, and the first optical guiding member 11 becomes the darker according to being closer to the other end 122 side. In addition, the one end 121 side of the second optical guiding member 12 in the longitudinal direction is the darkest, and the second optical guiding member 12 becomes the brighter according to being closer to the other end 122 side.

Therefore, when the control unit 30 lights up the optical source 20A of the first optical guiding member 11, then the optical source 20B of the second optical guiding member 12, lights out the optical source 20A of the first optical guiding member 11, and then the optical source 20B of the second optical guiding member 12, in the optical guiding body 10 the bright region of the light to be output can be made visible to a user in such a manner as to move from the one end to the other end in the longitudinal direction.

In this way, the optical sources 20 (20A, 20B) are provided only in the one ends of the optical guiding members (first optical guiding member 11 and second optical guiding member 12) in the longitudinal direction, and the bright region in the optical guiding body 10 is visible in such a manner as to move from the one end to the other end. Therefore, the substrate 2 on which the optical sources 20 (20A, 20B) are provided can be provided only in the one end side of the optical guiding body 10.

As a result, even if the length of the optical guiding body 10 formed of the optical guiding members (first optical guiding member 11 and second optical guiding member 12) in the longitudinal direction is made long, since the optical sources 20 (20A, 20B) are provided only in the one end in the longitudinal direction, it is not necessary to lengthen the length of the substrate 2 or prepare for the wire lead connecting the optical sources 20 (20A, 20B) and the substrate 2 separately. Accordingly, the light can be made visible to a user in such a manner as to move while avoiding the increasing size and increasing manufacturing cost of the illuminating device 1.

(2) In the optical guiding members (the first optical guiding member 11 and second optical guiding member 12), one surfaces of the optical guiding members in the thickness direction are the output surfaces 114, 124 of the light, and the output surface of the optical guiding body 10 is formed of the output surface 114 of the first optical guiding member 11 and the output surface 124 of the second optical guiding member 12 adjacent thereto in the width direction, the light shielding member 40 in a plate shape is further provided to cover the output surface of the optical guiding body 10, the band-like light diffusion portion 41 is provided inside from a peripheral edge 40a of the light shielding member 40 to diffuse the light output from the output surface 114 of the first optical guiding member 11 and the output surface 124 of the second optical guiding member 12, the light diffusion portion 41 is provided along the first optical guiding member 11 and second optical guiding member 12 in the longitudinal direction, is formed in an outer shape (area) arranged in a position offset by a predetermined width Wa inside from the peripheral edge of the output surface (the one end 111, the other end 112 and the side face 116 of the first optical guiding member 11, and the one end 121, the other end 122 and the side face 127 of the second optical guiding member 12) of the optical guiding body 10, and is provided to be sized to cover a region inside from the peripheral edge of the output surface of the optical guiding body 10.

With this configuration, the light output from the first optical guiding member 11 and the light output from the second optical guiding member 12 are diffused at the time of transmitting the light diffusion portion 41.

Here, the light output from the output surface 114 of the first optical guiding member 11 and from the output surface 124 of the second optical guiding member 12 is recognized as a stripe pattern due to the apex 115a of the prism 115 of the first optical guiding member 11 and the apex 125a of the prism 125 of the second optical guiding member 12, but when the light diffused by the light diffusion portion 41 traverses the regions of the apexes 115a, 125a, which makes it difficult to recognize the stripe pattern.

Further, the light diffused in the light diffusion portion 41 traverses the interval S1 between the output surface 114 of the first optical guiding member 11 and the output surface 124 of the second optical guiding member 12 adjacent thereto in the width direction, which makes it difficult to recognize the streaky shade due to the portion of the interval S1.

In addition, variations in luminance of the light output from the output surfaces (the output surface 114 of the first optical guiding member 11 and the output surface 124 of the second optical guiding member 12) of the optical guiding body 10 are averaged to be suppressed. Therefore, the stripe or streaky shade can be difficult to visualize as a whole.

In addition, the peripheral edge 41a of the light diffusion portion 41 is surrounded by the light shielding member 40 over the entire circumference, and in the optical guiding body 10 formed of the output surface 124 of the second optical guiding member 12, the peripheral edge of the optical guiding body 10 is clearly defined by the boundary between the light diffusion portion 41 and the light shielding member 40.

As a result, the peripheral edge of the light output from the optical guiding body 10 is clearly distinguished, which can appropriately prevent the phenomenon that the peripheral edge of the light to be output becomes vague and the boundary of the light to be visualized blurs.

(3) In the optical guiding members (first optical guiding member 11 and second optical guiding member 12), one surface of each of the optical guiding members in the thickness direction is formed as each of the output surfaces 114, 124 of the light, and the other surface is formed as each of the worked surfaces 113, 123 (reflecting surfaces) provided with the prisms 115, 125 that reflect the light incident into the respective optical guiding members to make an incident angle θ2 to the output surfaces 114, 124 of the reflected light less than a critical angle θ3, and in the first optical guiding member 11 and second optical guiding member 12, the distribution (density) of the prisms 115 and the distribution (density) of the prisms 125 in the longitudinal direction are changed to adjust the luminance distributions in the longitudinal direction of the light output from the output surfaces 114, 124.

With this configuration, the luminance distribution in the longitudinal direction of the light output from each of the output surfaces 114, 124 can be adjusted to a desired luminance distribution by changing the distribution (density) of each of the prisms 115 and the prisms 125 in the longitudinal direction.

(4) The prisms 115, 125 are formed of a plurality of sharp projections in which the apexes 115a, 125a are positioned in a direction away from the output surfaces 114, 124, the prisms 115, 125 of the optical guiding members (the first optical guiding member 11 and second optical guiding member 12) have the inclined surfaces 115b, 115c, 125b, 125c along the width direction of the optical guiding members in both the sides of the apexes 115a, 125a in the longitudinal direction of the optical guiding members, and the angle θa to the normal line VL of each of the output surface 114 and the output surface 124 of the inclined surfaces 115c, 125c is set such that the incident angle θ2 to each of the output surface 114 and the output surface 124 of the light reflected on the inclined surfaces 115c, 125c positioned in the other ends 112, 122 sides in the longitudinal direction is made less than the predetermined critical angle θ3 (broken lines in FIG. 2A) (refer to FIG. 2A).

With this configuration, the luminance distribution in the longitudinal direction of the light output from each of the output surfaces 114, 124 can be adjusted to a desired luminance distribution by changing the distribution (density) of the prisms 115 and the distribution (density) of the prisms 125 in the longitudinal direction.

Here, the lighting-up/lighting-out of the optical source 20A and the optical source 20B by the control unit 30 is not limited to the above mode, but the optical source 20A and the optical source 20B may light up alternately.

In addition, in the above-mentioned embodiment, the case where the illuminating device 1 is provided with the light shielding member 40 having the light diffusion portion 41 is exemplified, but the light shielding member 40 may be omitted. In this case also, the light can be made visible to a user in such a manner as to move while avoiding the increasing size of the illuminating device 1.

Figure 6:
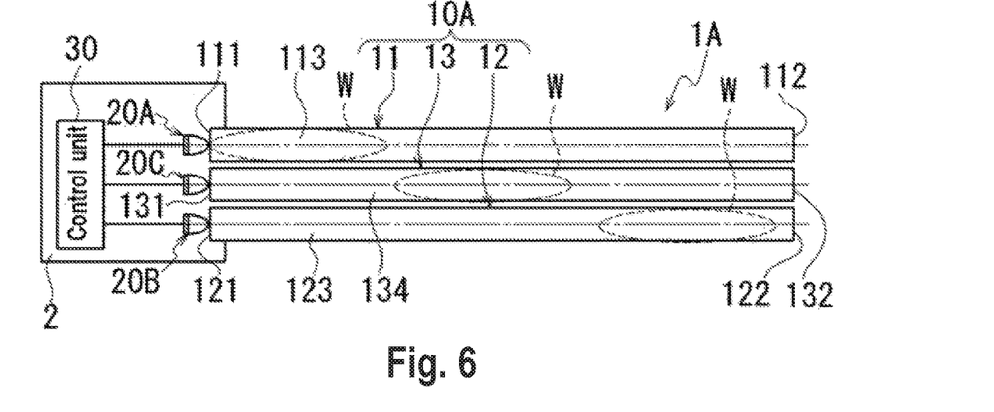
FIG. 6 is a diagram explaining an illuminating device with an optical guiding body according to a first modification.

FIG. 6 is a schematic diagram explaining an illuminating device 1A having an optical guiding body 10A according to a first modification, and is a plan view illustrating the illuminating device 1A as viewed from the output surface side of light.

Figure 7:
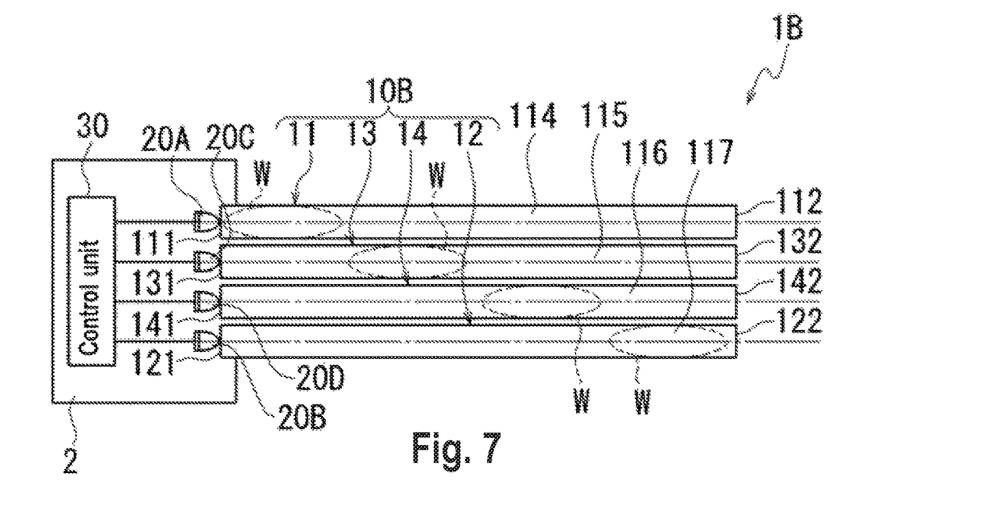
FIG. 7 is a diagram explaining an illuminating device with an optical guiding body according to a second modification.

FIG. 7 is a schematic diagram explaining an illuminating device 1B having an optical guiding body 10B according to a second modification, and is a plan view illustrating the illuminating device 1B as viewed from the output surface side of light.

It should be noted that in FIGS. 6 and 7, a region where the amount of light to be output is the largest is indicated at a sign W.

The above-mentioned embodiment has exemplified the case where the output surface of the optical guiding body 10 is formed of the output surfaces (the output surfaces 114, 124) of the two optical guiding members (the first optical guiding member 11 and second optical guiding member 12) disposed side by side in the width direction, but the optical guiding body 10 may be formed of at least two optical guiding members.

Accordingly, for example, as illustrated in FIG. 6, the optical guiding body 10A formed of three optical guiding members (first optical guiding member 11, second optical guiding member 12 and third optical guiding member 13) disposed side by side by predetermined intervals in the width direction may be adopted.

In this case, the density of the aforementioned prisms is preferably set as follows. In the third optical guiding member 13 positioned between the first optical guiding member 11 and second optical guiding member 12, the amount of the light output from the output surface 134 is the smallest in the one end 131 side and the other end 132 side in the longitudinal direction, and the amount of the light output is the largest in an intermediate region W between the one end 131 side and the other end 132 side in the longitudinal direction.

In addition, as illustrated in FIG. 7, an optical guiding body 10B formed of four optical guiding members (first optical guiding member 11, second optical guiding member 12, third optical guiding member 13 and fourth optical guiding member 14) disposed side by side by predetermined intervals in the width direction may be adopted.

In this case, the density of the aforementioned prisms is preferably set as follows. In the third optical guiding member 13, the amount of the light output from the one end 131 side and the other end 132 side in the longitudinal direction is the smallest and the amount of the light output from a region W closer to the one end 131 side than in the intermediate region between the one end 131 side and the other end 132 side in the longitudinal direction is large, and in the fourth optical guiding member 14, the amount of the light output from one end 141 side and the other end 142 side in the longitudinal direction is the smallest, and the amount of the light output from a region W closer to the other end 142 side than in an intermediate region between the one end 141 side and the other end 142 side in the longitudinal direction is the largest.

(5) In this way, the illuminating device 1B comprises:

the optical guiding body 10B configured to dispose the plurality of linear optical guiding members (first optical guiding member 11, second optical guiding member 12, third optical guiding member 13 and fourth optical guiding member 14) side by side in the width direction of the optical guiding members, the linear optical guiding members guiding the light incident from the one end in the longitudinal direction to the other end side;

the optical sources 20 prepared respectively for the optical guiding members to emit the light toward the corresponding optical guiding members; and the control unit 30 configured to control lighting-up/ lighting-out of each of the optical sources 20 (20A to 20D), wherein the luminance distributions of the light output from the optical guiding members (first optical guiding member 11, second optical guiding member 12, third optical guiding member 13 and fourth optical guiding member 14) are made to differ in the longitudinal direction of the optical guiding member, the luminance distribution of the light in the longitudinal direction output from the first optical guiding member 11 positioned on one side in the width direction is set in such a manner that a region of one end 111 side in the longitudinal direction is the brightest, the luminance distribution of the light in the longitudinal direction output from the second optical guiding member 12 positioned on the other side in the width direction is set in such a manner that a region of the other end 122 side in the longitudinal direction is the brightest, in the third optical guiding member 13 and the fourth optical guiding member 14 between the first optical guiding member 11 and the second optical guiding member 12, the luminance distribution of the light output from each of the optical guiding members is set such that a region W where the luminance distribution of the light to be output is the brightest moves from the one end (131, 141) side to the other end (132, 142) side in the longitudinal direction in order closer to the fourth optical guiding member 14 positioned in the second optical guiding member 12 side on the other side from the third optical guiding member 13 positioned in the first optical guiding member 11 side on the one side, and the control unit is configured in such a manner as to light up from the optical source 20A of the first optical guiding member 11 on the one side to the optical source 20B of the second optical guiding member 12 on the other end in order.

Also with this configuration, in the optical guiding body 10B, the bright region W is visible by a user in such a manner as to move from the one end to the other end in the longitudinal direction.

In this way, the optical sources 20 (20A to 20D) are provided only in the one ends of the optical guiding members (first optical guiding member 11, second optical guiding member 12, third optical guiding member 13 and fourth optical guiding member 14) in the longitudinal direction, and the bright region in the optical guiding body 10B is visible in such a manner as to move from the one end to the other end. Therefore, the substrate 2 on which the optical sources 20 (20A to 20D) are provided can be provided only in the one end of the optical guiding body 10B.

As a result, even if the length of the longitudinal direction of the optical guiding body 10B formed of the optical guiding members (first optical guiding member 11, second optical guiding member 12, third optical guiding member 13 and fourth optical guiding member 14) is made long, since the optical sources 20 (20A to 20D) are provided only in the one ends in the longitudinal direction, it is not necessary to lengthen the length of the substrate 2 or prepare for the wire lead connecting the optical sources 20 (20A, 20B) and the substrate 2 separately. Accordingly, the light can be made visible to a user in such a manner as to move while avoiding the increasing size and increasing manufacturing cost of the illuminating device 1.

As a result, the optical guiding body 10A can achieve the operation and the effect as similar to those in the above-mentioned embodiment as a whole.

Figure 8:
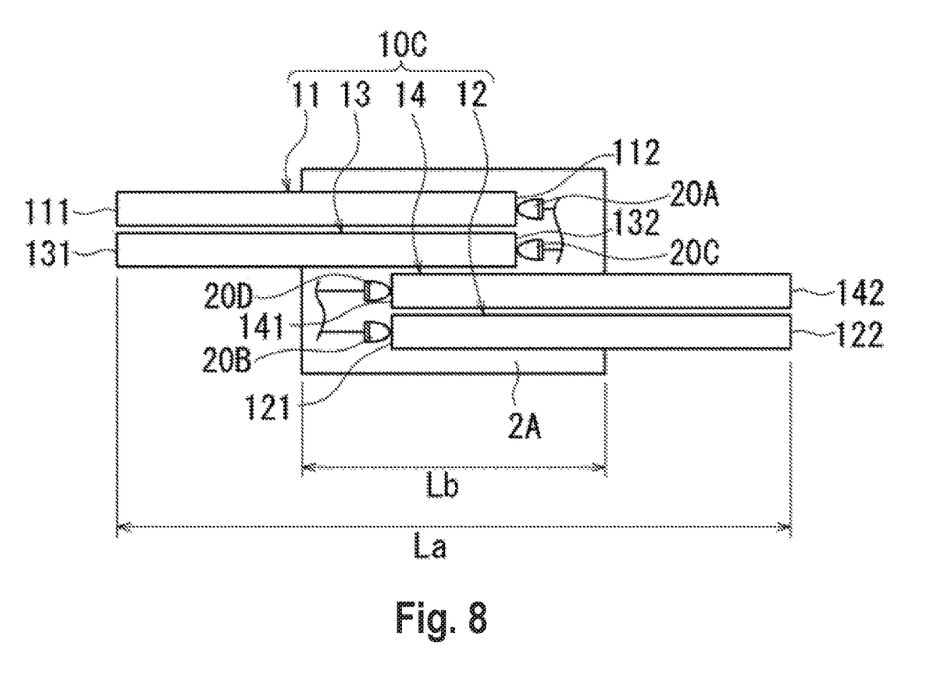
FIG. 8 is a diagram explaining an illuminating device with an optical guiding body according to a third modification.

FIG. 8 is a schematic diagram explaining an optical guiding body 10C according to a third modification.

The above-mentioned embodiment has exemplified the case where the first optical guiding member 11 and the second optical guiding member 12 are provided in parallel with each other to have the interval S1 in the width direction in a state of aligning positions of the one ends 111, 121 and aligning positions of the other ends 112, 122 in the longitudinal direction. However, for example, as illustrated in FIG. 8, in a case where an optical guiding body is formed of four optical guiding members (first optical guiding member 11, second optical guiding member 12, third optical guiding member 13 and fourth optical guiding member 14), the optical guiding body may be formed as an optical guiding body 10C comprising the four optical guiding members that are divided into two groups, wherein the optical guiding members (first optical guiding member 11 and third optical guiding member 13) included in one group and the optical guiding members (second optical guiding member 12 and fourth optical guiding member 14) included in the other group are provided in a positional relation of being offset from each other in the longitudinal direction of the optical guiding member.

In this case, in the optical guiding members (first optical guiding member 11 and third optical guiding member 13) included in the one group, the optical sources 20A, 20C are arranged to oppose the other ends 112, 132 in the longitudinal direction, and in the optical guiding members (second optical guiding member 12 and fourth optical guiding member 14) included in the other group, the optical sources 20B, 20D are arranged to oppose the one ends 121, 141 in the longitudinal direction. Thereby the optical sources 20A, 20C can be arranged close to the optical sources 20B, 20D in the longitudinal direction of the optical guiding member.

Therefore, in this case a length La of the optical guiding body 10C in the longitudinal direction formed of the first optical guiding member 11 to the fourth optical guiding member 14 is made long, and a length Lb of the substrate 2A in the longitudinal direction on which the optical sources 20A, 20B, 20C and 20D are mounted can be minimized.

Therefore, even if the length of the longitudinal direction of the optical guiding body 10C is made long, it is not necessary to prepare for the wire lead connecting the optical sources 20 (20A, 20B, 20C, 20D) and the substrate 2A separately. Since the length of the substrate 2A can be made shorter than an entire length of the optical guiding body 10C in the longitudinal direction, the light can be made visible in such a manner as to move while avoiding the increasing size and increasing manufacturing cost of the illuminating device 1.

(6) In this way, in the plurality of optical guiding members (first optical guiding member 11, second optical guiding member 12, third optical guiding member 13 and fourth optical guiding member 14) disposed side by side in the width direction, the two optical guiding members (first optical guiding member 11 and third optical guiding member 13) adjacent on the one side in the width direction are provided in a position offset in the longitudinal direction relative to the remaining optical guiding members (second optical guiding member 12 and fourth optical guiding member 14) adjacent on the other side, the optical sources 20A, 20C corresponding to the first optical guiding member 11 and third optical guiding member 13 are arranged in the other ends 112, 132 sides in the longitudinal direction, the optical sources 20B, 20D corresponding to the second optical guiding member 12 and fourth optical guiding member 14 are arranged in the one ends 121, 141 sides in the longitudinal direction, and the optical sources 20A to 20D are provided on the common substrate 2A, and the control unit 30 lights up the first optical guiding member 11, the third optical guiding member 13, the fourth optical guiding member 14 and the second optical guiding member 12 in order, and thereafter, lights them out in order.

Also with this configuration, the optical sources 20A, 20C corresponding to the first optical guiding member 11 and third optical guiding member 13 and the optical sources 20B, 20D corresponding to the second optical guiding member 12 and fourth optical guiding member 14 can be arranged on the common substrate 2A. Therefore, even if the length of the longitudinal direction of the optical guiding body 10B formed of the optical guiding members (first optical guiding member 11, second optical guiding member 12, third optical guiding member 13 and fourth optical guiding member 14) is made long, it is not necessary to lengthen the length of the substrate 2A or prepare for the wire lead connecting the optical sources 20 (20A to 20D) and the substrate 2A separately. Accordingly, the light is can be made visible to a user in such a manner as to move while avoiding the increasing size and increasing manufacturing cost of the illuminating device 1.

As a result, the optical guiding body 10C can achieve the operation and the effect as similar to those in the above-mentioned embodiment as a whole.

Figure 9:
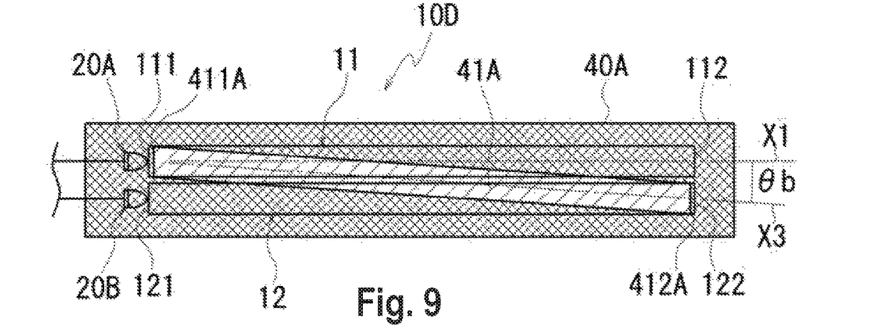
FIG. 9 is a diagram explaining a modification of a light shielding member.
Figure 10:
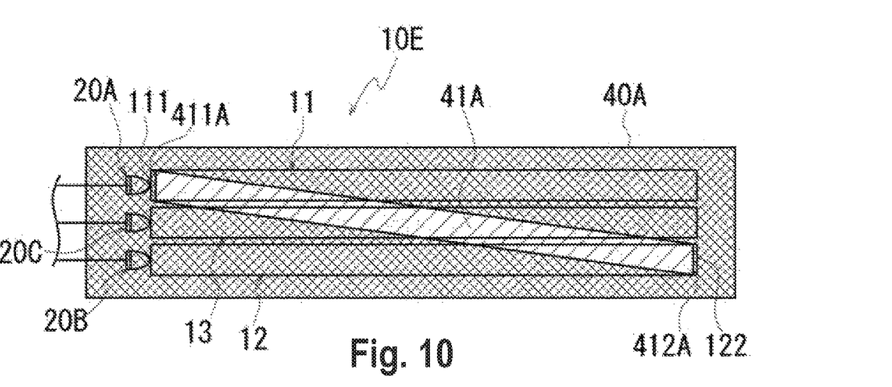
FIG. 10 is a diagram explaining a different modification of a light shielding member.
Figure 11:
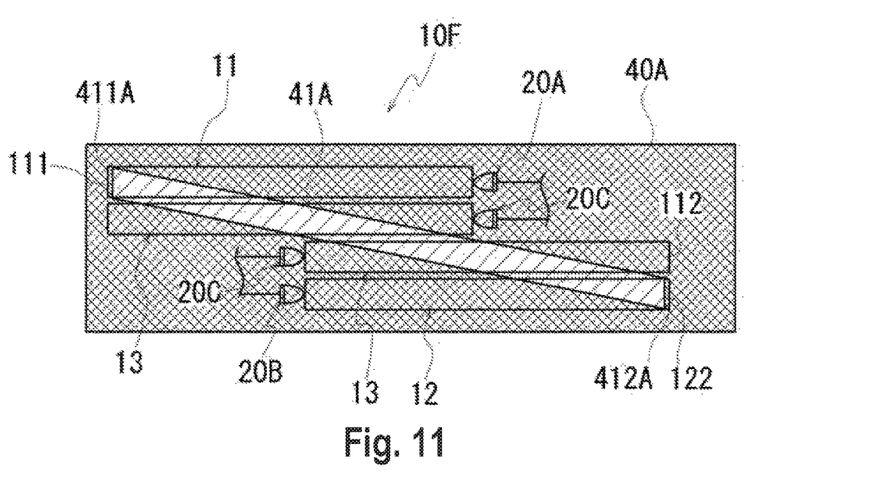
FIG. 11 is a diagram explaining a further different modification of a light shielding member.

FIG. 9 to FIG. 11 are diagrams explaining modifications of the light shielding member 40 having the light diffusion portion 41. The aforementioned embodiment has exemplified the case where the band-like light diffusion portion 41 provided in the light shielding member 40 is provided along the optical guiding members (first optical guiding member 11 and second optical guiding member 12) in the longitudinal direction, but as illustrated in FIG. 9 to FIG. 11, a light shielding member 40A configured to incline a light diffusion portion 41A by a predetermined angle to a center axis X1 along the longitudinal direction of the optical guiding member (first optical guiding member 11) may be adopted.

For example, as illustrated in FIG. 9, in a case where an optical guiding body 10D is formed of two optical guiding members (first optical guiding member 11 and second optical guiding member 12), preferably the light diffusion portion 41A is provided along a line segment X3 inclined by a predetermined angle θb to the center axis X1 along the longitudinal direction of the first optical guiding member 11 such that in a plan view, one end part 411A of the band-like light diffusion portion 41A in the longitudinal direction overlaps one end 111 side of the first optical guiding member 11, and the other end part 412A overlaps the other end 122 side of the second optical guiding member 12, and the band-like light diffusion portion 41A is provided to traverse a region (bright region) where the amount of light output from the first optical guiding member 11 and second optical guiding member 12 is large.

For example, as illustrated in FIG. 10, in a case where an optical guiding body 10E is formed of three optical guiding members (first optical guiding member 11, second optical guiding member 12 and third optical guiding member 13), preferably in a plan view, one end part 411A of the band-like light diffusion portion 41A in the longitudinal direction overlaps one end 111 side of the first optical guiding member 11, the other end part 412A overlaps the other end 122 side of the second optical guiding member 12, further a central part of the light diffusion portion 41A in the longitudinal direction overlaps a central part of the third optical guiding member 13 in the longitudinal direction, and the band-like light diffusion portion 41A is provided to traverse a region (bright region) where the amount of light output from the first optical guiding member 11, the second optical guiding member 12 and the third optical guiding member 13 is large.

Further, for example, as illustrated in FIG. 11, also in a case where an optical guiding body 10F has a plurality of optical guiding members (first optical guiding member 11, second optical guiding member 12, third optical guiding member 13 and fourth optical guiding member 14) disposed side by side in the width direction and the two optical guiding members (first optical guiding member 11 and third optical guiding member 13) adjacent on the one side in the width direction are provided in a position offset in the longitudinal direction relative to the remaining optical guiding members (second optical guiding member 12 and fourth optical guiding member 14) adjacent on the other side, the band-like light diffusion portion 41A is preferably provided to traverse a region (bright region) where the amount of light output from the first optical guiding member 11, the second optical guiding member 12 and the third optical guiding member 13 is large.

(7) In this way, there is further provided the light shielding member 40A covering the output surfaces of the plurality of optical guiding members (first optical guiding member 11, second optical guiding member 12, third optical guiding member 13 and fourth optical guiding member 14) disposed side by side in the width direction, a part of the light shielding member 40 is provided with the band-like light diffusion portion 41A transmitting and diffusing the light output from the output surface of the optical guiding member, the light diffusion portion 41A is provided to be inclined by a predetermined angle to the longitudinal direction of the optical guiding member such that one end part 411A side of the light diffusion portion 41 in the longitudinal direction overlaps one end 111 side of the first optical guiding member 11 in the longitudinal direction positioned on one side of the optical guiding members disposed side by side in the width direction, and the other end part 412A side overlaps the other end 122 side of the second optical guiding member 12 in the longitudinal direction positioned on the other side of the optical guiding members disposed side by side in the width direction, and the band-like light diffusion portion 41A is provided to traverse regions (bright regions) where the amount of light output from the respective optical guiding members (for example, first optical guiding member 11, second optical guiding member 12 and third optical guiding member 13) is large.

With this configuration, the band-like light diffusion portion 41A is provided to traverse the bright regions of the respective optical guiding members (for example, first optical guiding member 11, second optical guiding member 12 and third optical guiding member 13). There does not exist a clear boundary between the bright region and the dark region in the optical guiding member under the light diffusion portion 41A. Therefore, it can prevent luminance variations or blurs from being generated in the light transmitting the light diffusion portion 41A and visualized by a user.

Figure 12:
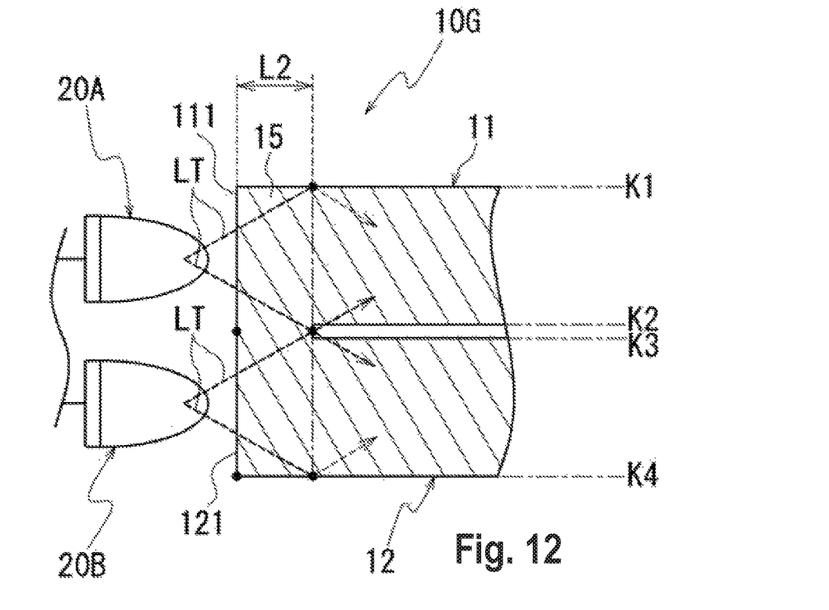
FIG. 12 is a diagram explaining an illuminating device with an optical guiding body according to another modification.

Next, an explanation will be made of an optical guiding body 10G according to another modification.

FIG. 12 is an enlarged cross section illustrating an essential part of the optical guiding body 10G according to the present modification.

The optical guiding body 10G has the first optical guiding member 11 and the second optical guiding member 12 that are arranged adjacent and in parallel to each other in the width direction, and the one end 111 side of the first optical guiding member 11 and the one end 121 side of the second optical guiding member 12 are connected by a connecting portion 15.

The connecting portion 15 is provided within a range of the predetermined length L1 from the one ends 111, 121 to the other ends 112, 122 sides of the first optical guiding member 11 and the second optical guiding member 12 (refer to FIG. 1B), and the optical guiding body 10G is integrally formed of the first optical guiding member 11, the second optical guiding member 12 and the connecting portion 15.

A length L2 of the connecting portion 15 is set to a length to the extent that the light incident from the one ends 111, 121 of the first optical guiding member 11 and the second optical guiding member 12 does not reach boundary surfaces K1, K2 between the first optical guiding member 11 and an exterior or boundary surfaces K3, K4 between the second optical guiding member 12 and an exterior in a section of the connecting portion 15 in the longitudinal direction.

When the incident light reaches the boundary surfaces K1 to K4 in the section of the connecting portion 15, the light is output from the reached boundary surfaces K1 to K4, therefore making it impossible to appropriately guide the light incident from the one ends 111, 121 to the other ends 112, 122 sides.

(8) In this way, the connecting portion 15 to the second optical guiding member 12 adjacent to the first optical guiding member 11 in the width direction is provided within the range of the predetermined length L1 (refer to FIG. 1B) from the one end 111 to the other end 112 side of the first optical guiding member 11, the first optical guiding member 11 and the second optical guiding member 12 disposed side by side in the width direction form the optical guiding body 10G by connecting the connecting portions 15 each other adjacent in the width direction, and the length L2 of the connecting portion 15 in the longitudinal direction is set to a length to the extent that the light from the optical source 20A (optical source 20B) incident from the one end 111 into the first optical guiding member 11 does not reach the boundary between the first optical guiding member 11 (the second optical guiding member 12) and an exterior of the first optical guiding member 11 (the second optical guiding member 12) in the connecting portion 15.

In a case where the first optical guiding member 11 and the second optical guiding member 12 are separately prepared, a tool is necessary to arrange the first optical guiding member 11 and the second optical guiding member 12 in a state of being disposed side by side in the width direction. However, according to the above configuration, since it is possible to integrally form the first optical guiding member 11 and the second optical guiding member 12 adjacent in the width direction at molding, it is not necessary to prepare for the tool.

In a case of using the tool, it is necessary to prepare for a space for installing the tool, but because of no necessity of such a tool, there is no necessity of providing this space.

That is, miniaturization of the illuminating device and a reduction in manufacturing cost due to no use of the connecting tool can be expected.

When the incident light reaches the boundary surfaces K1 to K4 in the section of the connecting portion 15, the light is output from the reached boundary surfaces K1 to K4, therefore making it impossible to appropriately guide the light incident from the one ends 111, 121 to the other ends 112, 122 sides, but the length L2 of the connecting portion 15 is set to the extent that the incident light does not reach the boundary surfaces K1 to K4 in the section of connecting portion 15, and therefore the light incident from the one ends 111, 121 can be appropriately guided to the other ends 112, 122 sides.

Figure 13:
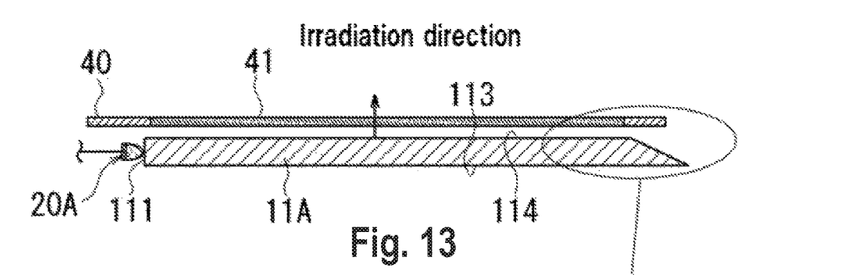
FIGS. 13 and 14 are diagrams explaining an illuminating device with an optical guiding body according to a further modification.

Next, an explanation will be made of an optical guiding member 11A according to a further modification.

FIG. 13 is a cross section illustrating the optical guiding member 11A according to the present modification.

Figure 14:
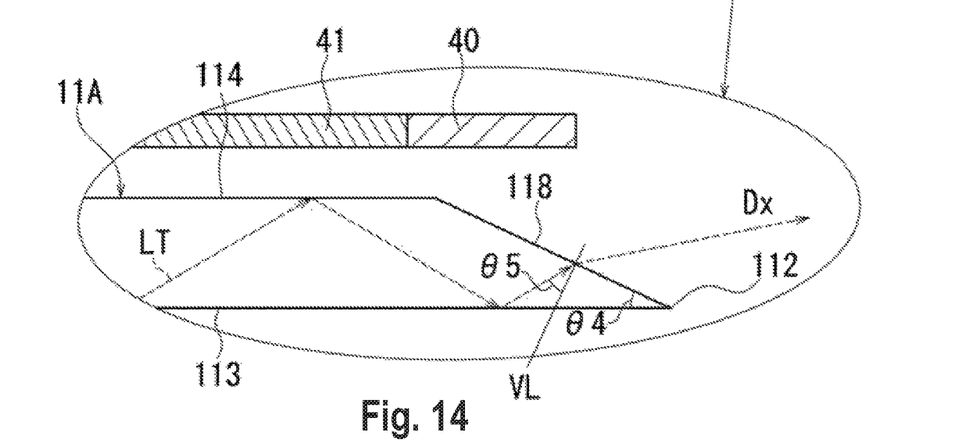

As illustrated in FIG. 14, an inclined portion 118 is provided in the other end 112 side of the optical guiding member 11A according to the present modification, the inclined portion 118 being placed in the light shielding member 40 side in a direction of having a thickness thinner according to being closer to the other end 112. The inclined portion 118 is inclined by a predetermined angle θ4 to the reflecting surface 113 (worked surface) on which the aforementioned prisms are provided.

In the present embodiment, an incident angle θ5 (angle to a normal line VL) of the light LT, which has reflected on the reflecting surface 113 (worked surface) and has reached the inclined portion 118, to the inclined portion 118 is smaller than a critical angle, and an angle θ4 of the inclined portion 118 is set such that an advancing direction of the light refracted on the inclined portion 118 is made to a direction (refer to Dx in FIG. 14) crossing the light shielding member 40 in a position away from at least the first optical guiding member 11.

(9) In this way, the other end 112 side of the optical guiding member 11A is provided with the inclined portion 118 the output surface of which is inclined to the reflecting surface 113 (worked surface) in such a direction that the thickness of the optical guiding member 11A is the thinner according to being closer to the other end 112 side.

The inclined angle of the inclined portion 118 to the reflecting surface 113 (worked surface) is set to an angle in which the light that has reflected on the reflecting surface 113 (worked surface) and has reached the inclined portion 118 is in a direction of advancing the other end 112 side of the optical guiding member 11A in the longitudinal direction and is refracted in the direction Dx crossing the light shielding member 40 in a position away from at least the first optical guiding member 11.

With this configuration, the light LT having reached the inclined portion 118 of the other end 112 side without being output from the output surface 114 after being incident on the optical guiding member 11A from the one end 111 is output toward an extension line direction (right direction in FIG. 14) of the optical guiding member 11A.

Here, in a case where the inclined portion 118 is not provided and the other end 112 is perpendicular to the output surface 114 as the other end 112 of the aforementioned first optical guiding member 11 (refer to FIGS. 2C and 2D), the light refracted from the other end 112 and output to an exterior is possibly output in an unintended direction. However, with the above configuration, there is no possibility that the output light is output in the unintended direction since the advancing direction of the light to be output from the inclined portion 118 can be controlled.

Accordingly, in a case where the output light is output in the unintended direction, the light is incident on the other optical guiding member adjacent in the width direction, and as a result of entering into the light output from the other optical guiding member, the luminance variations, or blurs or the like of the light to be output is possibly generated. However, it is possible to appropriately prevent the generation of this event.

In addition, the present embodiment has exemplified the case where the one optical source is provided in the one end side or the other end side of each optical guiding member, and the light output from the one optical source is incident on the optical guiding member, but a plurality of optical sources may be provided to the optical guiding member to which the light output from each optical source is incident.

With this configuration, the luminance of the one optical guiding member changes in response to the lighting-up numbers of the plurality of optical sources, making it possible to achieve multihued illumination effects by gradation or the like.

In addition, the above-mentioned embodiment has exemplified the case where the brightness of the light on the output surface is adjusted by changing the interval between the prisms in the longitudinal direction to be narrow or wide, but the present invention is not limited thereto, and the interval between the prisms in the longitudinal direction may be constant, and a range (area) in which the prisms are formed on the backside of the optical guiding member may be changed in the longitudinal direction.

For example, in the first embodiment, the formation range of the prisms 115 on the worked surface 113 of the first optical guiding member 11 is wider on the one end 111 side of the first optical guiding member 11 than on the other end 112 side, and the formation range of the prisms 125 on the worked surface 123 of the second optical guiding member 12 is wider on the other end 122 side of the second optical guiding member 12 than on the one end 121 side.

Even with this configuration, in the first optical guiding member 11, the output amount of the light in the one end 111 is larger (brighter) than in the other end 112, and in the second optical guiding member 12, the output amount of the light in the other end 122 is larger (brighter) than in the one end 121. As a result, the operational effect as similar to that of the aforementioned embodiment can be achieved.

In addition, the aforementioned embodiment has exemplified the case where a cross section of the optical guiding member is formed in a rectangular shape, but the present invention is not limited thereto, but the cross section of the optical guiding member may be formed in a circular shape, in a semicircular shape or in an elliptic shape, and even in such a shape, the effect as similar to the aforementioned effect can be achieved.

The illuminating device 1, 1A or 1B can be used for, for example, illumination production within a compartment for a vehicle.

In this case, for example, since it is possible to light up/out the illuminating device 1, 1A or 1B in response to ON of an ignition switch or an opening/closing operation of a vehicle door in a predetermined pattern in the aforementioned embodiment, appropriate illumination production is made possible.

While only the selected embodiments have been chosen to illustrate the present invention, it will be apparent to those skilled in the art from this disclosure that various changes and modifications can be made therein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. An illuminating device comprising:
   an optical guiding body configured to dispose linear optical guiding members side by side in a width direction of the linear optical guiding members, the linear optical guiding members guiding light incident from one end side in a longitudinal direction to another end side;
   optical sources prepared respectively for the linear optical guiding members to emit light toward the corresponding linear optical guiding members; and
   a control unit configured to turn on and off each of the optical sources;
   wherein:
   the optical guiding body includes a first optical guiding member and a second optical guiding member adjacent thereto in the width direction;
   a luminance distribution of the light in the longitudinal direction emitted from the first optical guiding member becomes darker according to being closer to the other end side from the one end side;
   a luminance distribution of the light in the longitudinal direction emitted from the second optical guiding member becomes brighter according to being closer to the other end side from the one end side;
   the control unit lights up the optical source of the first optical guiding member and the optical source of the second optical guiding member in order and thereafter, lights them out in order;
   in each of the first and second optical guiding members, one surface of the respective optical guiding member in a thickness direction is formed as an output surface of the light, and an output surface of the optical guiding body is formed of an output surface of the first optical guiding member and an output surface of the second optical guiding member adjacent thereto in the width direction;
   the illuminating device further comprises a light shielding member for covering the output surface of the optical guiding body;

a band-like light diffusion portion is provided inside from a peripheral edge of the light shielding member to diffuse the transmitted light; and the light diffusion portion is provided to be inclined by a predetermined angle to the optical guiding member in the longitudinal direction such that one end side of the optical diffusion portion in the longitudinal direction overlaps one end side of the first optical guiding member in the longitudinal direction, and another end side of the optical diffusion portion overlaps the other end side of the second optical guiding member in the longitudinal direction.

2. An illuminating device comprising:

an optical guiding body configured to dispose linear optical guiding members side by side in a width direction of the optical guiding members, the linear optical guiding members guiding light incident from one end side in the longitudinal direction to another end side;

optical sources prepared respectively for the optical guiding members to emit light toward the corresponding optical guiding members; and a control unit configured to turn on and off each of the optical sources;

wherein:
    luminance distributions of the light output from the optical guiding members are made to differ in the longitudinal direction of the optical guiding member,
    the luminance distribution of the light in the longitudinal direction output from the optical guiding member positioned on one side in the width direction is set in such a manner that a region of one end side in the longitudinal direction is the brightest,
    the luminance distribution of the light in the longitudinal direction output from the optical guiding member positioned on the other side in the width direction is set in such a manner that a region of the other end side in the longitudinal direction is the brightest,
    in the optical guiding members disposed side by side in the width direction between the optical guiding members positioned on the one side and on the other side in the width direction, the luminance distribution of the light output from each of the optical guiding members is set such that a region where the luminance distribution of the light to be output is the brightest moves from the one end side to the other end side in the longitudinal direction in order closer to the optical guiding member positioned in the optical guiding member side on the other side from the optical guiding member positioned in the optical guiding member side on the one side, and
    the control unit lights up from the optical source of the optical guiding member on the one side to the optical source of the optical guiding member on the other end in that order;
    in the optical guiding member, one surface of the optical guiding member in the thickness direction is formed as an output surface of the light, further comprising a light shielding member for covering output surfaces of a plurality of the optical guiding members disposed side by side in the width direction of the optical guiding members;
    a band-like light diffusion portion is provided in a part of the light shielding member to transmit and diffuse the light output from the output surface of the optical guiding member; and
    the optical diffusion portion is provided to be inclined by a predetermined angle to the optical guiding member in the longitudinal direction such that one end side of the light diffusion portion in the longitudinal direction overlaps one end side of the optical guiding member in the longitudinal direction positioned on the one side of the optical guiding members disposed side by side in the width direction, and the other end side thereof overlaps the other end side of the optical guiding member in the longitudinal direction positioned on the other side of the optical guiding members disposed side by side in the width direction.

3. An illuminating device comprising:

an optical guiding body configured to dispose linear optical guiding members side by side in a width direction of the linear optical guiding members, the linear optical guiding members guiding light incident from one end side in a longitudinal direction to another end side;

optical sources prepared respectively for the linear optical guiding members to emit light toward the corresponding linear optical guiding members; and a control unit configured to turn on and off each of the optical sources;

wherein:
    the optical guiding body includes a first optical guiding member and a second optical guiding member adjacent thereto in the width direction;
    a luminance distribution of the light in the longitudinal direction emitted from the first optical guiding member becomes darker according to being closer to the other end side from the one end side;
    a luminance distribution of the light in the longitudinal direction emitted from the second optical guiding member becomes brighter according to being closer to the other end side from the one end side;
    the control unit lights up the optical source of the first optical guiding member and the optical source of the second optical guiding member in order and thereafter, lights them out in order;
    in the optical guiding member, one surface of the optical guiding member in the thickness direction is formed as an output surface of the light, and the other surface is formed as a reflecting surface of the light incident into the optical guiding member;
    the other end side of the optical guiding member is provided with an inclined portion the output surface of which is inclined such that a thickness of the optical guiding member is the thinner according to being closer to the other end side; and
    an inclined angle of the inclined portion to the reflecting surface is set to an angle in which the light that has reflected on the reflecting surface and has reached the inclined portion is refracted in a direction in which the light exits out of the other end side of the optical guiding member in the longitudinal direction.

* * * * *